United States Patent
Inglot (10) Patent No.: US 10,235,847 B2
(45) Date of Patent: Mar. 19, 2019

(54) METHOD OF REMOTE CONTROLLING A LUMINOUS SIGNALLING SYSTEM IN THE COURSE OF SPORTS GAMES PLAYED BY ORALLY AND AURALLY CHALLENGED PLAYERS AND A SET OF ELECTRONIC DEVICES FOR APPLICATION OF THE METHOD

(71) Applicant: INGLOT Marcin F.H.U. IngTrans, Lancut (PL)

(72) Inventor: Marcin Inglot, Lancut (PL)

(73) Assignee: INGLOT Maran F.H.U. IngTrans, Lancut (PL)

( * ) Notice: Subject to any disclaimer, the term of this patent is extended or adjusted under 35 U.S.C. 154(b) by 0 days.

(21) Appl. No.: 16/060,332

(22) PCT Filed: Dec. 5, 2016

(86) PCT No.: PCT/EP2016/002041
§ 371 (c)(1),
(2) Date: Jun. 7, 2018

(87) PCT Pub. No.: WO2017/097408
PCT Pub. Date: Jun. 15, 2017

(65) Prior Publication Data
US 2018/0365939 A1    Dec. 20, 2018

(30) Foreign Application Priority Data
Dec. 10, 2015 (EP) .................................. 15460110

(51) Int. Cl.
*G08B 5/36* (2006.01)
*G10K 5/00* (2006.01)
(Continued)

(52) U.S. Cl.
CPC ............ *G08B 5/36* (2013.01); *A63B 71/0605* (2013.01); *G10K 5/00* (2013.01); *A63B 2225/50* (2013.01)

(58) Field of Classification Search
CPC ....................................................... G08B 5/36
See application file for complete search history.

(56) References Cited

U.S. PATENT DOCUMENTS

| 5,507,246 A * | 4/1996 | Rand, Jr. ................ G10K 5/00 116/137 R |
| 6,794,989 B2 | 9/2004 | Naegely |

(Continued)

FOREIGN PATENT DOCUMENTS

| DE | 2716717 | 10/1978 |
| EP | 1586876 | 10/2005 |
| JP | 3965225 | 8/2007 |
| WO | WO2007125476 | 11/2007 |

OTHER PUBLICATIONS

XP002768786—"Electronics Tutorail—Input Interfacing Circuits"; Mar. 24, 2017.

*Primary Examiner* — Joseph H Feild
*Assistant Examiner* — Pameshanand Mahase
(74) *Attorney, Agent, or Firm* — Defillo & Associates, Inc.; Evelyn A. Defillo (57) ABSTRACT

A method of remote controlling a luminous signalling system in the course of team game played by orally and aurally challenged players under the supervision of a referee or umpire equipped with whistle and a transmitting-receiving device. The referee uses, in cases provided by regulations applicable to the practiced sports discipline, an electronic whistle equipped with a rotor coupled with a reed relay, a sensor, and a transmitting device by blowing air into mouthpiece of the whistle, the air being transferred to a sensor activating this way the rotor and generating a signal at input of microprocessor of the transmitting device which in turn (Continued)

activates a remote control transmitter of the transmitting device and via transmitting antenna of the device sends radio binary signals received by a receiving antenna of an electronic receiving device and sent to its remote control receiver resulting in appearance of binary signals at the output of the receiver which, after the data sequences being analyzed and decoded by microprocessor of the receiving device powered from a power pack, converts the data sequences into an executive signal which, by a relay, switches on the luminous signalling system of the receiving device and automatically connects said device electrically with appropriate leads feeding LEDs mounted in LED strips which, together with the single electronic receiving device, are installed on the surface of a playing field such as a pitch or a court or in a swimming pool in locations decisive for determining whether the game is played in accordance with rules of given sports discipline.

4 Claims, 8 Drawing Sheets

(51) Int. Cl.
*B60R 1/12* (2006.01)
*B60K 35/00* (2006.01)
*G09F 19/22* (2006.01)
*A63B 71/06* (2006.01)

(56) References Cited

U.S. PATENT DOCUMENTS

| | | | |
|---|---|---|---|
| 7,173,533 B1* | 2/2007 | Beron | G08B 1/08 340/4.12 |
| 8,866,599 B2* | 10/2014 | Delia | A63B 71/0616 340/326 |
| 2016/0150995 A1* | 6/2016 | Ratto | A61B 5/0022 600/532 |

* cited by examiner

Detail "S"

Fig. 16

METHOD OF REMOTE CONTROLLING A LUMINOUS SIGNALLING SYSTEM IN THE COURSE OF SPORTS GAMES PLAYED BY ORALLY AND AURALLY CHALLENGED PLAYERS AND A SET OF ELECTRONIC DEVICES FOR APPLICATION OF THE METHOD

CROSS REFERENCE TO RELATED APPLICATION

This application is a national stage entry of PCT/EP2016/002041 filed Dec. 5, 2016, under the International Convention claiming priority over European Patent Application No. 15460110.8 filed Dec. 10, 2015.

TECHNICAL FIELD

The subject of the invention is a method of remote controlling a luminous signalling system activated in the course of team games played according to rules of different sports disciplines by orally and aurally challenged players and a set of electronic devices for application of the method.

BACKGROUND OF THE INVENTION

Known from patent description No. EP 1586876 A1 is a whistle and a device notifying about using the whistle which generates and transmits an information when the whistle is blow, and lamp apparatuses equipped with receiving antennas situated in corners of a sports playing area and at ends of its half-way line receive radio signals transmitted from the whistle, demodulate whistle information and perform illumination of a lamp in accordance with the intensity of the sound of the whistle, which can be ascertained visually by hearing-impaired persons. The whistle has a body with a mouthpiece, a rolling element contained in resonant chamber of the body vibrations of which are detected by a sensor, a detection section which detects the motion of the rolling element, a whistle information generation section that generates whistle information when motion of the rolling element is detected by the detection section, and a transmitting section equipped with an antenna which transmits the whistle information. Further, the whistle comprises a selection section which produces at its output a signal of a level in accordance with the magnitude of motion of the rolling element and a transmission output adjustment section that adjusts transmission output of the transmitting section. In turn, each of the whistle signalling lamp apparatuses has a receiving section equipped with an antenna which receives a radio signal and demodulates whistle information, and a lamp illumination section and a control section that performs illumination control of the illumination section when whistle information is demodulated by said receiving section.

Description of invention granted U.S. Pat. No. 6,794,989 B2 also discloses a wireless device useful for a hearing impaired person(s) for enabling said person to receive instructions from another person while participating in a sport-related activity. The device comprises a transmitter unit comprising at least two means for receiving a physical impulse for transmitting instructions as a wireless output signal and comprising at least two depressible buttons or keys, and a portable unit adapted to be carried by the hearing impaired person responsive to said wireless signal thereby providing instructions to said person by generating a signal comprising a vibration and then generating a second signal providing a colour illuminating visual signal, which has the form of a different colour illumination corresponding an individual depressible button or key of the transmitter unit.

Also invention described in U.S. Pat. No. 7,173,533 B1 discloses a system alerting sports participants who cannot detect audible signals, a whistle coupled to a referee and operable to emit a first signal, a transceiver coupled to the referee and operable to detect the first signal and emit a second signal in response to the first signal, a remote control device coupled to a coach and operable to emit a third signal, a receiver coupled to a sports participant and operable to receive the second signal and the third signal, and a light coupled to the receiver comprising two bulbs, of which the first light bulb is operable to illuminate in response to the receipt of the second signal, and the second light bulb operable to illuminate in response to the receipt of the third signal. Moreover, the system comprises a vibrating device coupled to the receiver and operable to vibrate in response to receipt of the second signal or the third signal.

SUMMARY OF THE INVENTION

The objective of the invention is to provide a system which will enable orally and aurally challenged athletes associated in respective sports clubs to participate in team sports games with the participation of a referee overseeing the team games in different sports disciplines, especially played on sports pitches and courts.

The subject matter of the method of remote controlling a luminous signalling system in the course of sport games played by orally and aurally challenged players overseen by a referee or umpire equipped with a whistle for conformity with rules of the practised sports game consists in that the referee overseeing a match of a team game played by said players or a swimming competition participated by said player uses, in cases provided by regulations applicable to the given sports discipline, an electronic whistle equipped with a rotor coupled with a reed relay as well as a sensor and a a transmitting device, by blowing air into the mouthpiece of the whistle, said air being thus directed onto said sensor, activating the rotor, and generating a signal at input of said transmitting device, as a result of which, via transmitting antenna of the transmitting device, radio binary signals are sent and received then by a receiving antenna of an electronic receiving device resulting thus in occurrence of binary signals at its output, said signals being further analysed for presence of data sequences which, after being decoded by microprocessor of the receiving device powered from a power supply pack and converted into an executive signal which, by means of a relay, switches on the luminous signalling system of the receiving device and automatically connects said device electrically with appropriate leads feeding LEDs arranged in LED strips which, together with the single electronic receiving device are installed on the surface of a playing field such as a pitch or a court or in a swimming pool in locations decisive for determining whether the game is played in accordance with rules of given sports discipline, said location including all straight, circular, and arched lines of various colors which demarcate such playing fields of swimming pools.

Advantageously, the referee uses, in cases provided by regulations applicable to the currently practised sports discipline, instead of the electronic whistle described above, an electronic whistle equipped with a sensor reacting to pressure exerted by mouth of the referee, said sensor being further coupled with a reed relay which transmits a signal onto input of microprocessor of an electronic transmitting device analogous to this described above.

In turn, the set of electronic devices for remote controlling a luminous signalling system in the course of team games played by orally and aurally challenged players comprising technical means of illumination is characterised in that the set comprises an electronic whistle and a single electronic receiving device coupled electrically with a feeding lead supplying power for LED strips, whereas housing of the electronic whistle is equipped with a transmitting device with microprocessor output of which is connected with input of a remote control transmitter equipped with a transmitting antenna and an electric battery connected with said transmitter and with microprocessor input of which is connected with output of the blow sensor situated in the mouthpiece portion of said housing, whereas the sensor is coupled also with a rotor coupled with a reed relay generating pulses counted by said microprocessor, while the electronic receiving device of the set comprises a remote control receiver equipped with a receiving antenna, output of said receiver being connected with input of a microprocessor connected bidirectionally with a system for detecting position of the referee on the sports field and with input of a relay output of which is connected with input of the luminous signalling system connected with lead supplying power to feeding LEDs mounted in elastic LED strips connected electrically to each other and installed, together with said electronic receiving device, on surface of the sports field in locations marked in colours according to regulations applicable to the practised sports discipline, whereas both the microprocessor and the remote control receiver coupled electrically with the latter are connected to a power pack.

Advantageously, the electronic whistle comprises also a sensor reacting to pressure exerted by mouth of the referee, said sensor being situated in mouthpiece portion of the whistle, coupled with a reed relay, and further coupled with microprocessor of analogous electronic transmitting device.

Installing a network of LED strips connected electrically with an electronic receiving device providing electric power supply to said networks in response to a signal received from the electronic transmitting device installed located in whistle used by the referee or umpire overseeing the game or competition at strategic locations of a pitch, court or swimming pool used for playing a specific team game or holding a competition, made playing the game or participating in competition available to orally and aurally challenged players or competitors. By continuing visual observation of the playing pitch, field, or court in the course of game overseen by a referee or umpire and focusing attention on locations of diodes lit at given instants of time on the pitch of court surface in response to signal sent by the referee or umpire by means of his or her whistle, the players will be able to accommodate themselves to commands of the referee/umpire and it will be possible to complete the game in normal time according to game rules.

Further, the referee's/umpire's whistle with an electronic transmitting device, the luminous signalling LED network, and the electronic deceiving device are characterised with simple and compact structure, easy to install on any sports pitch, court, or field at relatively low investment cost.

BRIEF DESCRIPTION OF THE DRAWINGS

The subject of the invention will be explained in more detail by means of example embodiments shown in drawings, of which:

FIGS. 1-11 show sports pitches, courts and other types of facilities where team sports events are held, equipped additionally with technical means co-operating with the electronic whistle used by a referee or umpire overseeing such games participated by orally and aurally challenged players when necessary in the light of rules and regulations universally applicable to given sports discipline.

DETAILED DESCRIPTION OF THE INVENTION

Example 1

Figure 1:
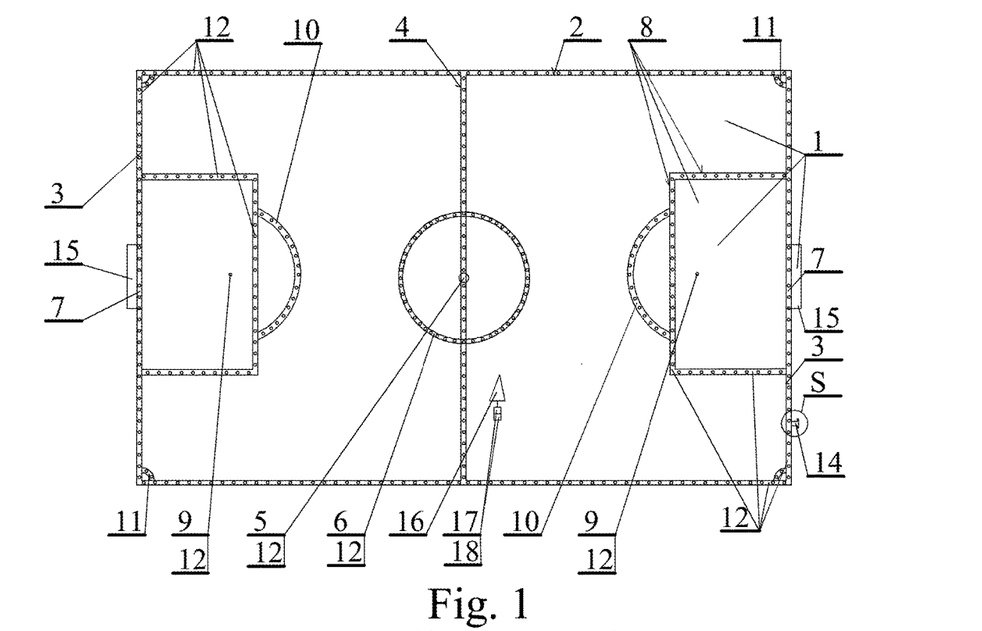
FIG. 1 shows the football (soccer) pitch.

A football (soccer) pitch 1, along both longer side lines 2, along both shorter sides 3, along half-way line 4, at the centre spot 5, along the centre circle 6, along the goal field line 7 and the penalty area line 8, at the penalty spot 9, along the semi-circle line 10 adjacent to the penalty, and along quarter-circle corner lines 11 of the pitch, is equipped with elastic LED strips 12 placed in a housing not shown in the figure. Individual LEDs of these strips are connected to each other electrically, and their common feeder lead 13 is connected electrically with the electronic receiving device 14 installed on the pitch surface and power-supplied by said feeder lead outside the playing field, preferably near the penalty area 15, whereas the referee 16 overseeing the football match is equipped with whistle 17 with electronic transmitting device 18.

Example 2

Figure 2:
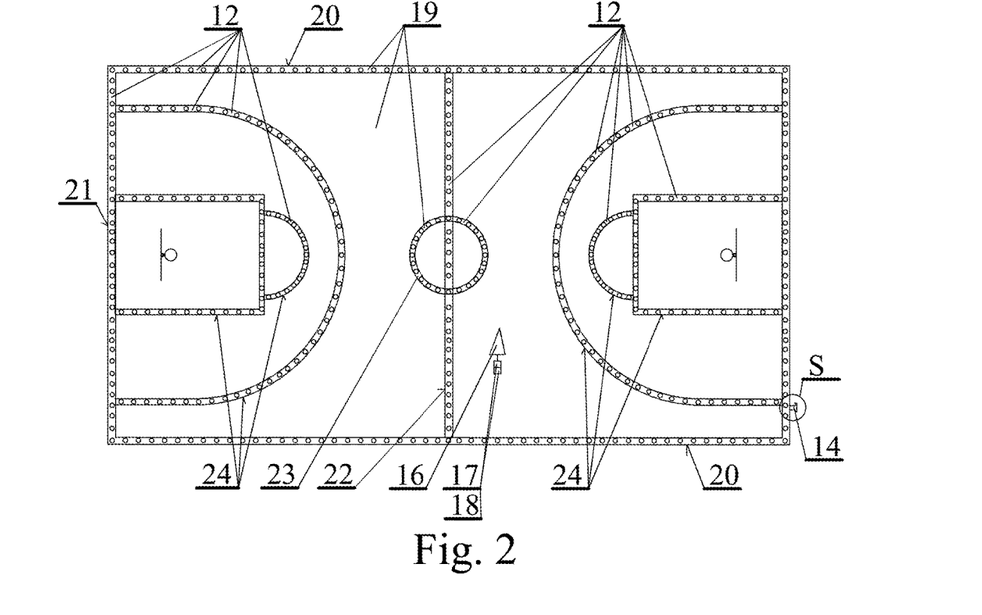
FIG. 2—the basketball court.

A basketball court 19, along both sidelines 20, along both end lines 21, along division line 22, along centre circle 23, and along all throw lines 24, is equipped with elastic LED strips 12, encased in housings not shown in the figure. Individual LEDs of these strips are connected to each other electrically, and their common feeder lead 13 is connected electrically with the electronic receiving device 14 installed within on the court surface and power-supplied by said feeder lead, whereas the referee 16 overseeing the match is equipped with whistle 17 with electronic transmitting device 18.

Example 3

Figure 3:
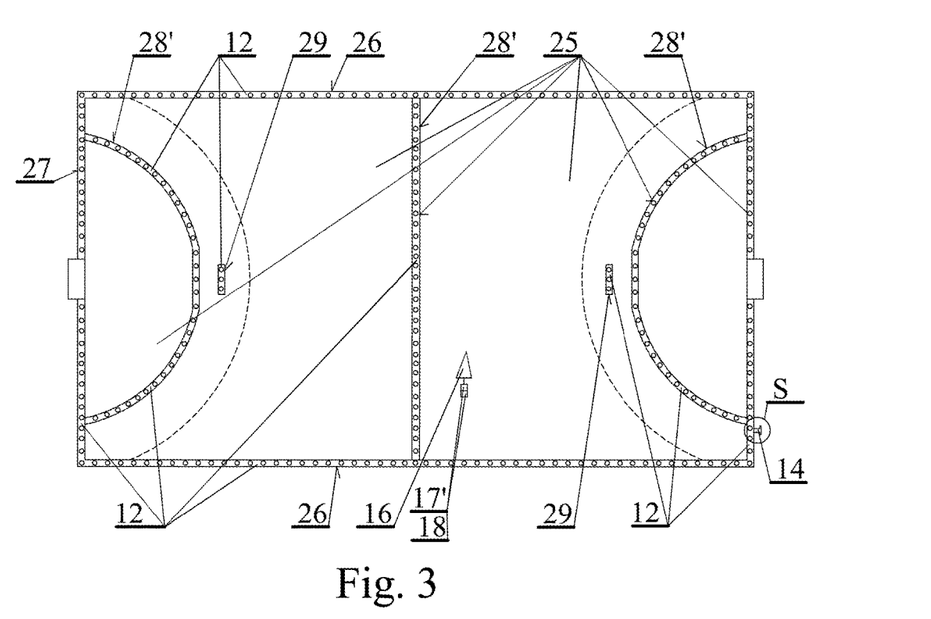
FIG. 3—the handball court.

A handball court 25, along both side lines 26, along both outer goal lines 27, along the centre line 28, along both goal-area lines 28, and along both penalty marks 29, has installed elastic LED strips 12. Individual LEDs of these strips are connected to each other electrically, and their common feeder lead 13 is connected electrically with the electronic receiving device 14 installed on the court surface and power-supplied by said feeder lead, whereas the referee 16 overseeing the match is equipped with whistle 17 with electronic transmitting device 18.

Example 4

Figure 4:
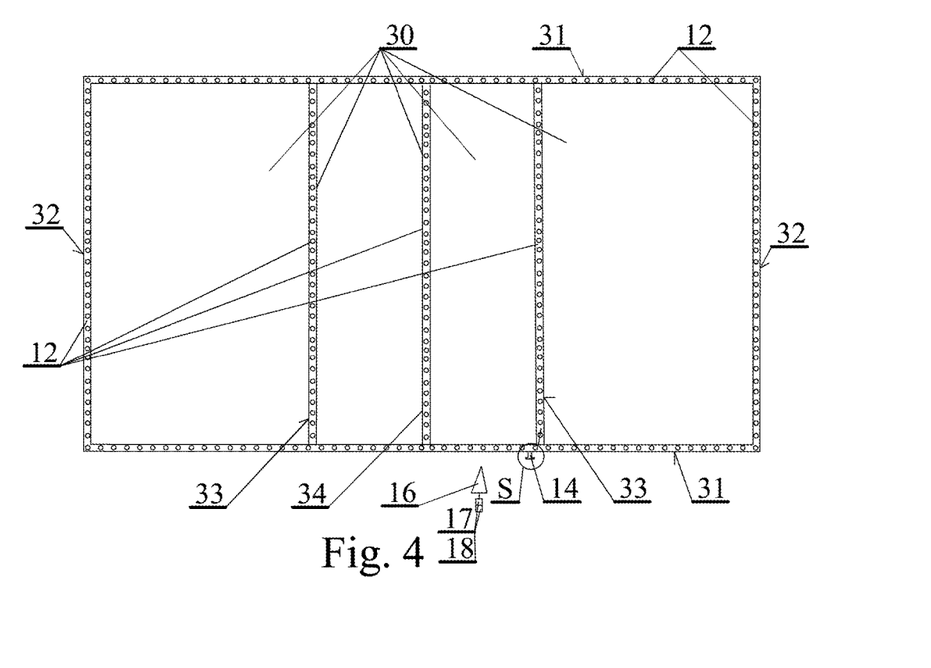
FIG. 4—the volleyball court.

A volleyball court 30, along both side lines 31, along both end lines 32, along both attack lines 33, and along the centre net line 34, is equipped with elastic LED strips 12. Individual LEDs of these strips are connected to each other electrically, and their common feeder lead 13 is connected electrically with the electronic receiving device 14 installed on the court surface and power-supplied by said feeder lead, whereas the referee 16 overseeing the match is equipped with whistle 17 with electronic transmitting device 18.

Example 5

Figure 5:
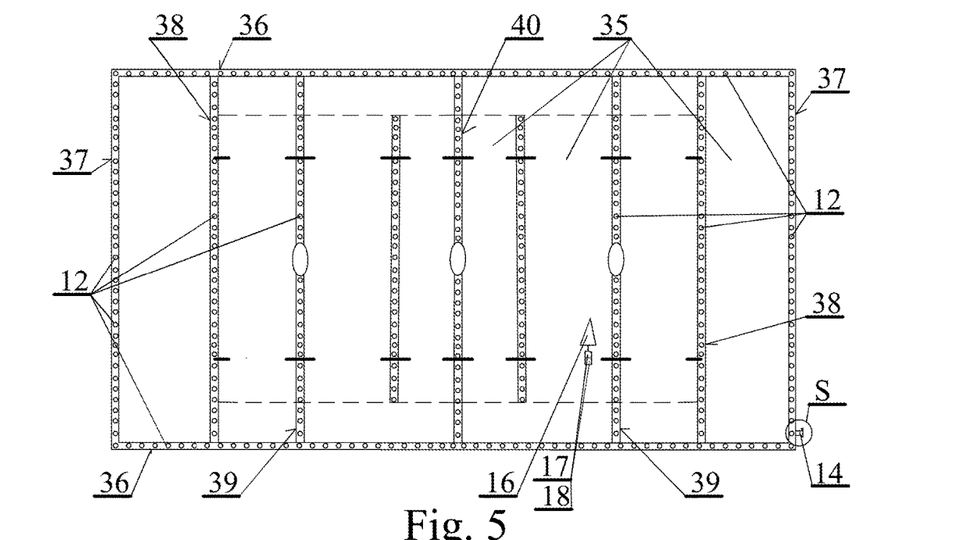
FIG. 5—the rugby pitch.

A rugby pitch 35, along both touch lines 36 and both side lines, along both dead ball lines 37, along both try lines 38, along both defence field lines 39, and along the half way line 40, is equipped with elastic LED strips 12. Individual LEDs of these strips are connected to each other electrically, and their common feeder lead 13 is connected electrically with the electronic receiving device 14 installed on the pitch surface and power-supplied by said feeder lead, whereas the referee 16 overseeing the match is equipped with whistle 17 with electronic transmitting device 18.

Example 6

Figure 6:
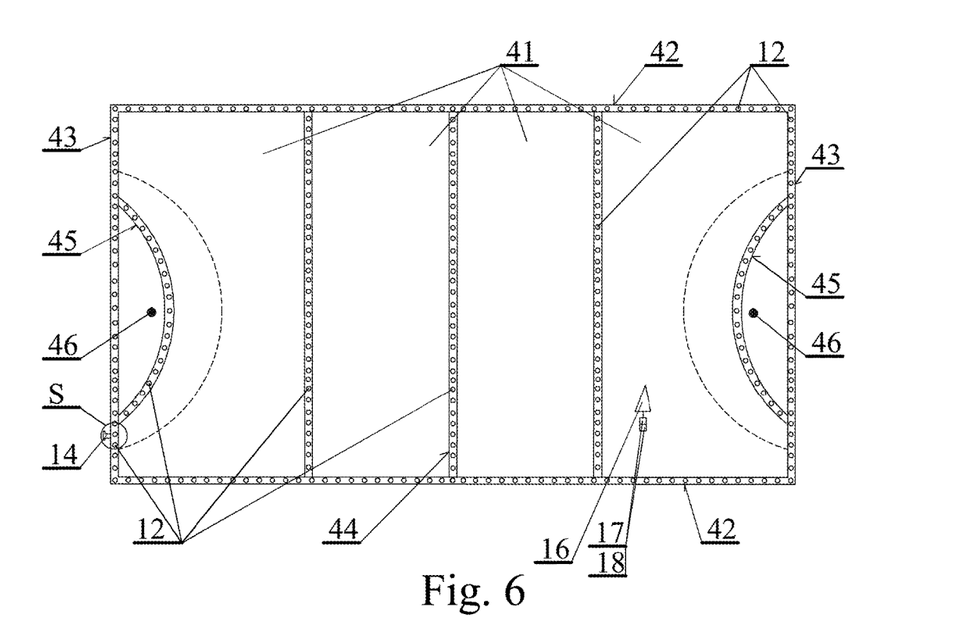
FIG. 6—the hockey field.

A hockey pitch 41, along both side lines 42, along both end lines 43, along the centre line 44, along both shooting circles 45, and at the penalty spot 46, is equipped with elastic LED strips 12. Individual LEDs of these strips are connected to each other electrically, and their common feeder lead 13 is connected electrically with the electronic receiving device 14 installed on the pitch surface and power-supplied by said feeder lead, whereas the referee 16 overseeing the match is equipped with whistle 17 with electronic transmitting device 18.

Example 7

Figure 7:
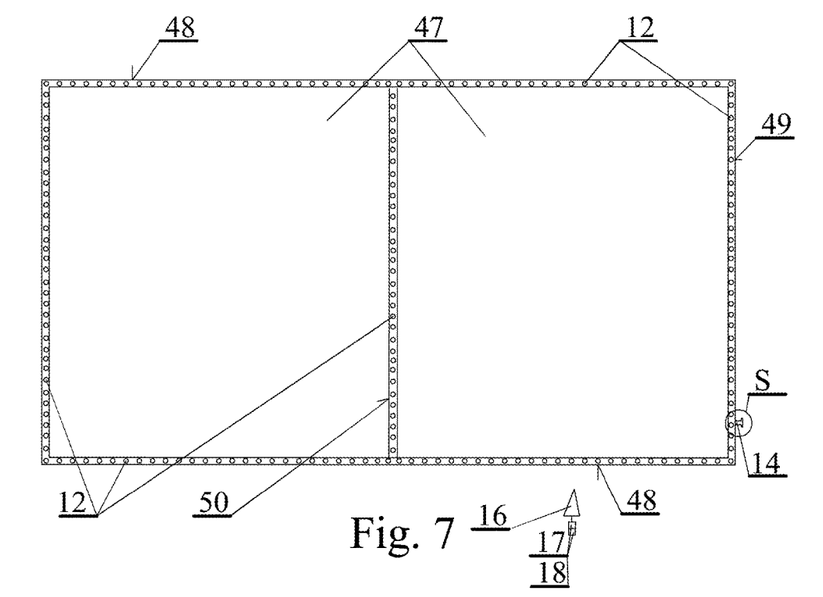
FIG. 7—the beach volleyball court.

A beach volleyball court 47, along both side lines 48, along both end lines 49, and along the centre line 50, is equipped with elastic LED strips 12. Individual LEDs of these strips are connected to each other electrically, and their common feeder lead 13 is connected electrically with the electronic receiving device 14 installed on the court surface and power-supplied by said feeder lead, whereas the umpire 16 overseeing the match is equipped with whistle 17 with electronic transmitting device 18.

Example 8

Figure 8:
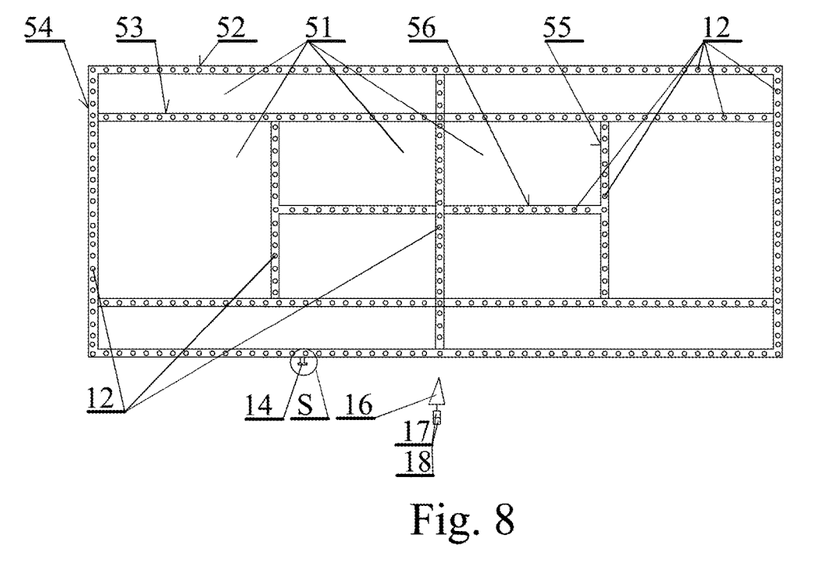
FIG. 8—the tennis court.

A tennis court 51, along both doubles sidelines 52 and 53, along both singles sidelines 53 and 54, along both baselines 54, along both service lines 55, and along the net line 56, is equipped with elastic LED strips 12. Individual LEDs of these strips are connected to each other electrically, and their common feeder lead 13 is connected electrically with the electronic receiving device 14 installed on the court surface and power-supplied by said feeder lead, whereas the umpire 16 overseeing the match is equipped with whistle 17 with electronic transmitting device 18.

Example 9

Figure 9:
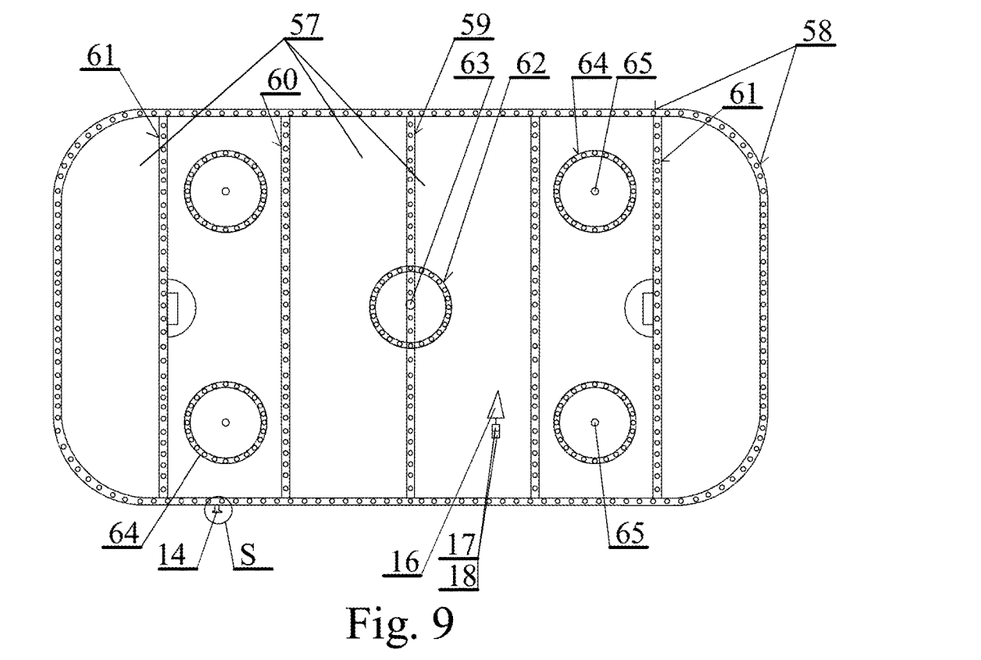
FIG. 9—the ice hockey rink.

An ice hockey rink 57, along its boards 58, along centre red line 59, along both blue attacking zone lines 60, along both goal lines 61, along the circle 62 surrounding the centre faceoff spot 63, and along four circles 64 surrounding four end zone faceoff spots 65, is equipped with elastic LED strips 12. Individual LEDs of these strips are connected to each other electrically, and their common feeder lead 13 is connected electrically with the electronic receiving device 14 installed on the rink surface and power-supplied by said feeder lead, whereas the referee 16 overseeing the match is equipped with whistle 17 with electronic transmitting device 18.

Example 10

Figure 10:
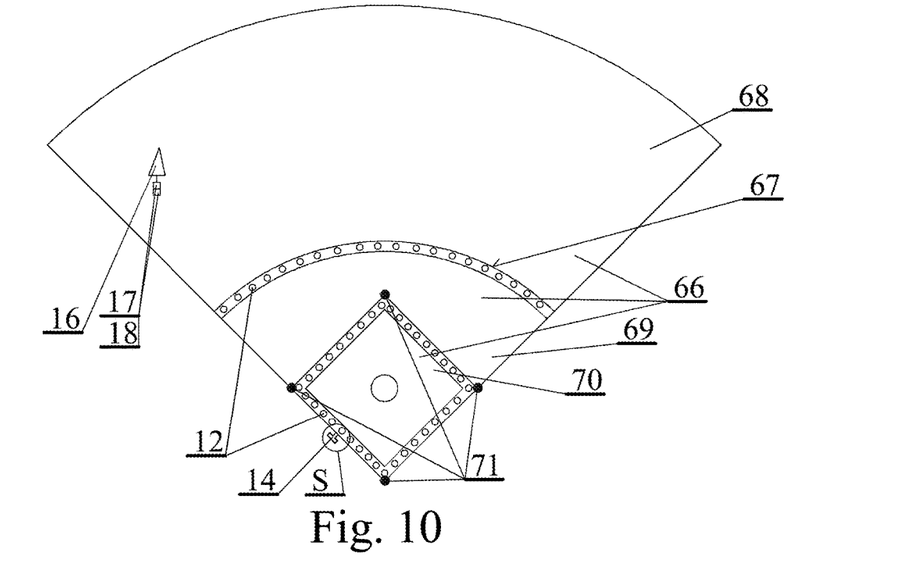
FIG. 10—the baseball field.

A baseball field 66, along its arched line 67 separating the grass outfield 68 from infield 69 and 70, around the square field 70 around the pitchers mound, and at four corner bases 71, is equipped with elastic LED strips 12. Individual LEDs of these strips are connected to each other electrically, and their common feeder lead 13 is connected electrically with the electronic receiving device 14 installed on the field surface and power-supplied by said feeder lead, whereas the umpire 16 overseeing the game has a whistle 17 with electronic transmitting device 18.

Example 11

Figure 11:
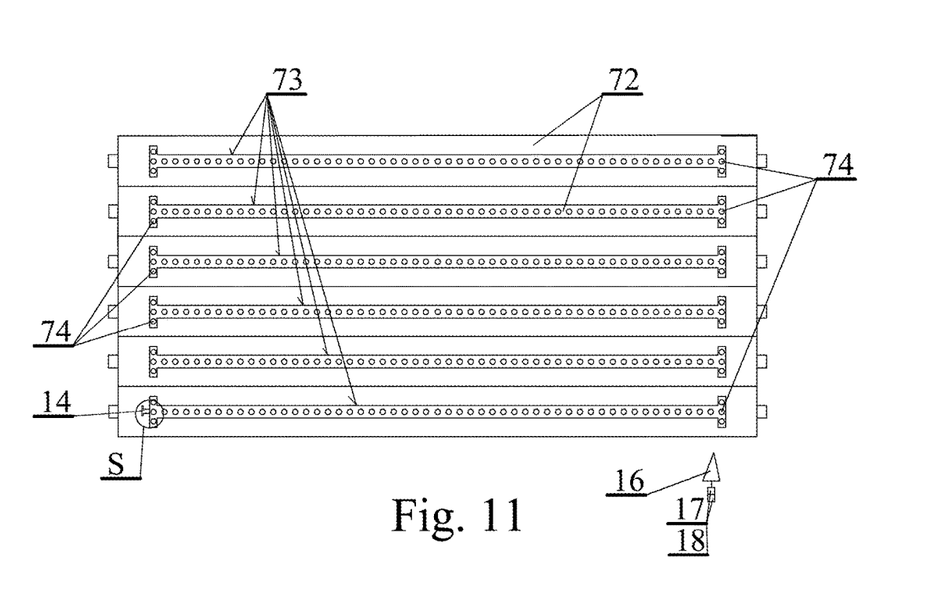
FIG. 11—the Olympic-size swimming pool.

An Olympic-size swimming pool 72 is equipped with elastic LED strips 12 along its lane lines 73 and on touch pads 74. Individual LEDs of these strips are connected to each other electrically, and their common feeder lead 13 is connected electrically with the electronic receiving device 14 installed on the pool and power-supplied by said feeder lead, whereas referee 16 overseeing the competition has a whistle 17 with electronic transmitting device 18.

Example 12

Figure 12:
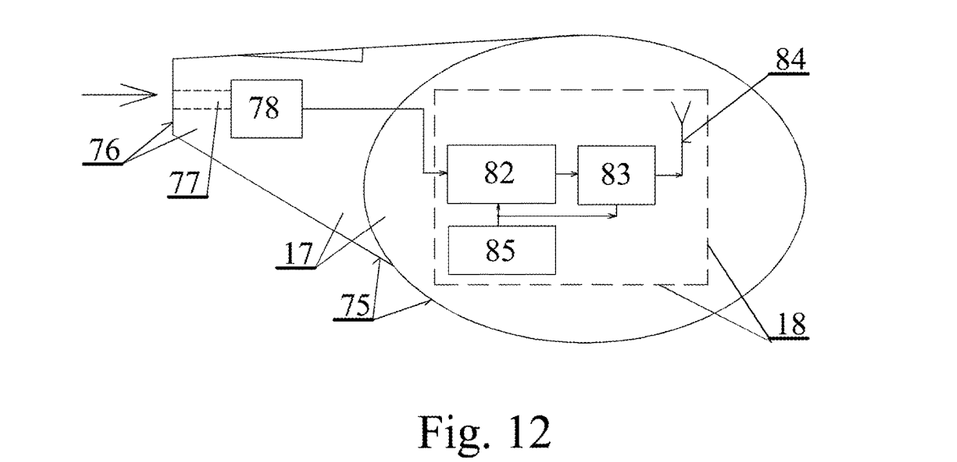
FIG. 12—the block diagram of the first variant of embodiment of the referee's electronic whistle equipped with a transmitting device.
Figure 13:
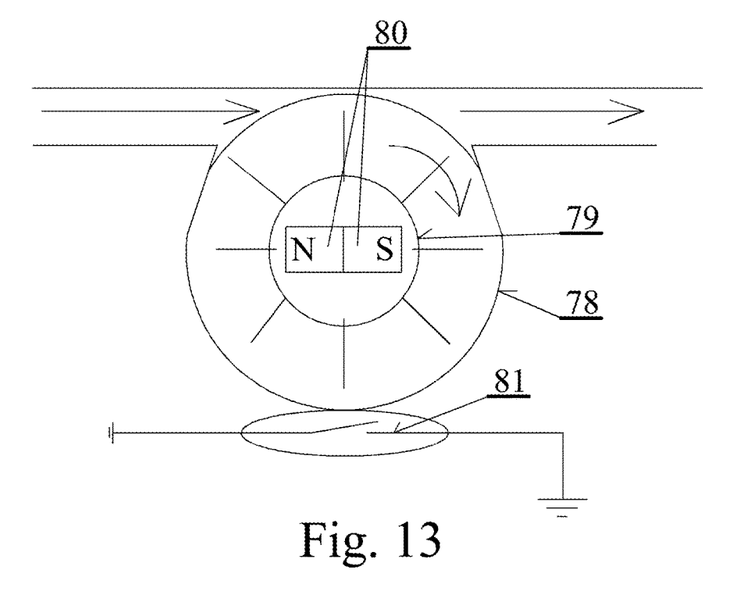
FIG. 13—a schematic-block diagram of the blow sensor of the same referee's electronic whistle.

As it has been shown in FIGS. 12 and 13, the whistle 17 of the transmitting device 18 in its first example embodiment comprises a housing 75 with a mouthpiece 76 having an inlet 77 for the air blown into the mouthpiece. Downstream the mouthpiece, a blow sensor 78 is located with a rotor 79 equipped with N-S magnet 80 and a ferreed relay 81, whereas the sensor is connected with input of the microprocessor 82, output of which is connected with input of the remote control transmitter 83 equipped with a transmitting antenna 84 and controlled by said microprocessor which, together with said transmitter, is powered from the electric battery 85, also located in housing 19 of whistle 17. Microprocessor 82 of the transmitting device has an input which counts pulses coming from ferreed relay 81 activated by means of magnet 80 placed in rotor 79 of the blow sensor 78.

Example 13

Figure 14:
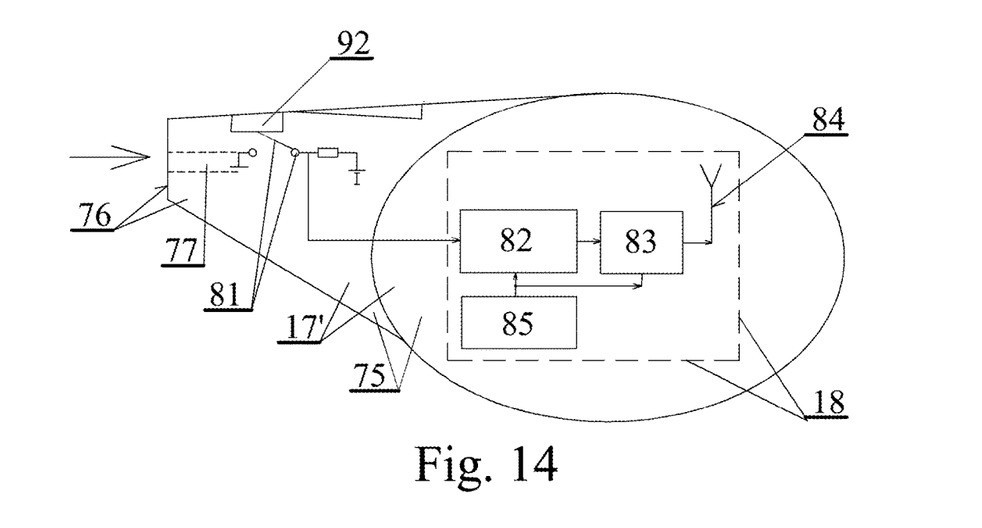
FIG. 14—a block diagram of the second variant of embodiment of the referee's electronic whistle equipped with a transmitting device.

In this variation, whistle 17' of the transmitting device 18 according to the second example embodiment shown in FIG. 14 differs from whistle 17 shown in FIGS. 12 and 13 in that downstream the inlet 77 of air below into the mouthpiece 76, there is a sensor 92 activated by pressure exerted by mouth of referee 16, said sensor being connected with reed relay 81. The output of the relay is connected to input of microprocessor 82 of the electronic transmitting device 18, whereas the contact of the reed relay closes the circuit as a result of activation of the sensor.

The electronic transmitting device 18 has a unique address constituting a means of protection against accidental activation of the luminous signalling system 85 by another transmitter co-operating with an electronic receiving device. If the address of said transmitting device is incorrect, the receiving device does not react in any way to pulses (commands) emitted by the transmitting device. Unique addresses of the transmitting device 18 constitute a two-byte information representing e.g. a number from the range 0-65535 saved in memory of microprocessor 82 of said device, whereas in the course of a synchronisation process, said unique address is transmitted to the receiving device and saved in memory of its microprocessor 86. If the receiving device receives a set of data, it checks whether the set contains the address saved earlier in memory of its microprocessor 86, and the set of data with unknown address is ignored by the receiving device.

Example 14

Figure 15:
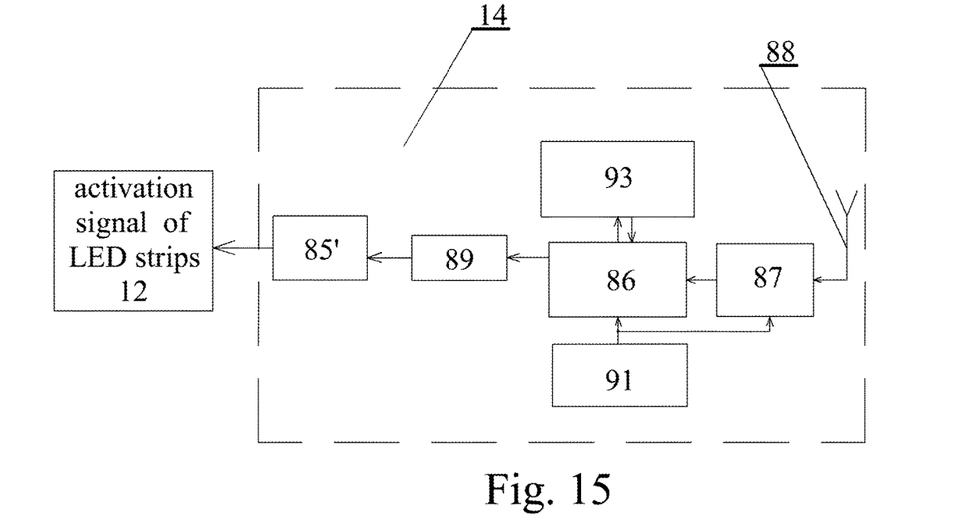
FIG. 15—an electronic receiving device for receiving binary signals emitted by the transmitting device of the referee's whistle.
Figure 16:
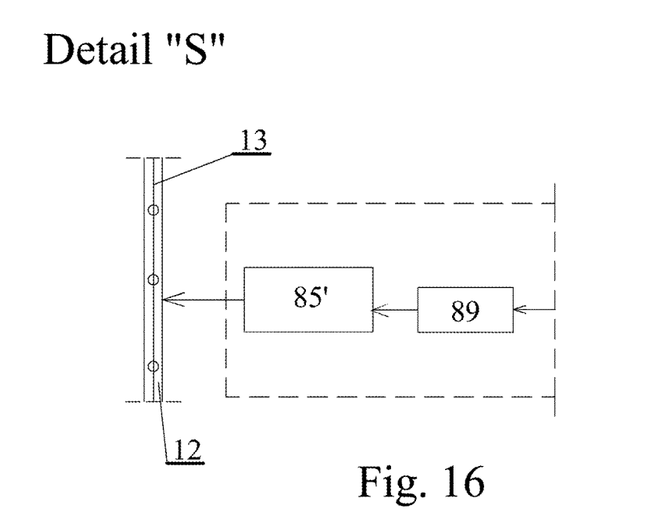
FIG. 16—detail "S" of connection of the electronic receiving device with circuits of LED strips installed on pitch or court surfaces or in a swimming pool, shown in FIGS. 1-11.

Further, the electronic receiving device 14 presented in FIG. 15 comprises a remote control signal receiver 87 provided with a receiving antenna 88, output of said receiver being connected with input of microprocessor 86 connected bidirectionally with a system 93 for detecting position of the referee 16 within the area of the sports field, court or pitch and with the input of relay 89 output of which is connected with the input of the luminous signalling system 85 connected with the common lead 13 feeding LEDs mounted in elastic LED strips 12, whereas both the microprocessor 86 and the remote control receiver 87 coupled electrically with said processor are powered from power pack 91.

In an extended version of the embodiment, not shown in the figures, two relays 89 and 89' are connected to microprocessor 86, and each of the relays is connected to two separate luminous signalling systems 85 and 85', of which the relay 89' and the luminous signalling system 85' function as detectors of position of referee 16 on the court or pitch.

The principle of operation of a set of electronic devices allowing to apply the luminous signalling system on the football (soccer) pitch (FIG. 1) in the course of a match played by two teams members of which are orally and aurally challenged persons consists in that if an event occurs requiring intervention of the referee 16 according to applicable rules of the game, the referee uses a whistle 17 blowing air into its mouthpiece 76. As a result of such blow, the blow sensor 78 is activated in such a way that rotor 79 located therein starts to rotate and generates a signal at input of microprocessor 82, whereas pulses coming from the ferreed relay 81 activated by means of magnet 80 installed in said rotor are counted. If the stream of air blown into the mouthpiece 76 is sufficiently intensive, then magnet 80 cyclically closes contacts of the ferreed relay 81 resulting in a series of pulses occurring at input of the microprocessor 82. Once the signals are detected by microprocessor 82 on its measuring inputs, it activates the remote control transmitter 83, which by means of the radio and via its transmitting antenna 84, sends coded binary signals to the receiving antenna 88 of the electronic receiving device 14. The signals are sent to the device's remote control receiver 87. This results in appearance of binary signals at output of the receiver and microprocessor 86 performs an analysis of the data sequences and subjects them to decoding, checking their consistence with predetermined parameters and converting them into an executive signal which switches the luminous signalling system 85 on. If the result of decoding the obtained data is correct, microprocessor 86 via relay 85 switches appropriate luminous signalling system 85 on together with LEDs installed in LED strips 12 installed on surface of pitch 1.

Coded binary signals of the electronic transmitting device are composed of five bytes assigned the following meaning:
byte 1 is a prefix containing a fixed pre-defined number;
byte 2 is the older byte of an unique address;
byte 3 is the younger byte of an unique address;
byte 4 is a command constituting an instruction for the receiving device to execute a specific operation;
byte 5 is the control sum used for checking correctness of the received data set, whereas the data set is coded into a sequence of binary states by means of biphase coding of Manchester type. Initially, the binary signal in question assumes the state corresponding to its binary value, but at half of the byte transmission time, the signal is reversed in such a way that 0 is represented by high signal level and 1 corresponds to the low level of the signal, whereas the byte transmission rate is 5-10 kilobytes per second and the gaps between data sets are 5-20 ms long.

Moreover, the location system 93 identifying position of referee 16 of the electronic receiving device allows to activate luminous signalling identifying the referee at the specific point of the pitch 1 in order to attract attention of players to the referee as well as to lit LED strips 12 installed on the surface of the given pitch or court.

The principle of operation of a set of electronic devices for application of the luminous signalling system in the course of a match played by two teams members of which are orally and orally challenged persons, described above for the case of football (soccer) match, can be applied also in case of a match of two teams playing other sports games on such sports facilities as: the volleyball court 19; the handball court 25; the volleyball court 30; the rugby pitch 35; the hockey field 41; the beach volleyball court 47; the tennis court 51; the ice hockey rink 57; the baseball field 66; or the swimming pool 72, shown in FIGS. 2-11.

Also in these cases, the principle of operation of the set of devices according to the invention consists in that as a result of air being blown by the referee 16 into the inlet 77 of mouthpiece 76 of whistle 17, the or as a result of pressure exerted by mouth of the referee 16 on mouthpiece of whistle 17', the blow sensor 78 or the mouth pressure sensor 92, respectively, will generate the signal a signal at the input of microprocessor 82, and once the signal is detected by said microprocessor on its measuring inputs, it activates the remote control transmitter 83 which via its transmitting antenna 84 sends coded binary radio signals to the receiving antenna 88 of the remote control signal receiver 87 of the electronic receiving device 14. This results in appearance of binary signals at output of the receiver and microprocessor 86 performs an analysis of the data sequences. In case when the result of decoding is correctly, the microprocessor, by means of relay 89, switches on the luminous signalling system 85 which feeds power to LEDs mounted in LED strips 12 installed in surface of the pitch or court specific for given sports discipline.

The invention claimed is:

1. A method of remote controlling a luminous signalling system in the course of sports games played by orally and aurally challenged players, the method comprising the steps of:
   a referee overseeing a match of a team game played by said players or a swimming competition participated by said players uses an electronic whistle equipped with a remote control transmitter comprising a transmitting antenna and a sensor, by blowing air into a mouthpiece of the electronic whistle, said air being thus directed onto said sensor which detects vibrations excited inside the whistle and activates the transmitter which, via the transmitting antenna, sends radio binary signals received then by a receiving antenna of an electronic receiving device resulting in switching on a LED-based luminous signalling system installed in surface of a sports field, wherein the referee uses an electronic whistle equipped with a rotor coupled with a reed relay, a sensor, and a transmitting device by blowing air into the mouthpiece of the whistle said air being thus transferred to sensor, activating the rotor and generating a signal at input of a microprocessor of said transmitting device which in turn activates a remote control transmitter of the transmitting device and, via the transmitting antenna of the device sends radio binary signals received by the receiving antenna of an electronic receiving device and send to the remote control receiver, resulting in appearance of binary signals at output of the receiver which, after the data sequences being analysed and decoded by microprocessor of said receiving device powered from a power pack converts said data sequence into an executive signal which by a relay switches on the luminous signalling system of the receiving device and automatically connects said device electrically with appropriate leads feeding LEDs mounted in LED strips, which together with the single electronic receiving device are installed on the playing pitch or a court or in a swimming pool in locations decisive for determining whether the game is played in accordance with rules of given sports discipline;
   said locations including all straight, circular, and arched lines of various colours which demarcate such playing fields of swimming pools.

2. The method according to claim 1, wherein the referee uses, in cases provided, instead of the electronic whistle and electronic whistle equipped with a sensor (92) reacting to pressure exerted by mouth of the referee, said sensor being further coupled with a reed relay which transmits signal onto input of microprocessor of analogous electronic transmitting device.

3. A set of electronic devices for remote controlling a luminous signalling system in the course of team games played by orally and aurally challenged players, comprising an electronic whistle equipped with a body with a mouthpiece and a sensor, further equipped in a transmitting device with a transmitting antenna and a microcomputer and equipped also in an electronic receiving device co-operating with a luminous signalling system which are installed in a surface of a sport field, wherein comprises an electronic whistle and a single electronic receiving;
   a device coupled electrically with a feeding lead supplying power for LED strips, whereas housing of the electronic whistle is equipped with a transmitting device with microprocessor output of which is connected with input of a remote control transmitter equipped with a transmitting antenna and an electric battery connected with said transmitter and with the microprocessor input of which is connected with output of the blow sensor situated in the mouthpiece portion of said whistle housing, whereas the sensor is coupled also with a rotor coupled in turn with a reed relay generating pulses counted by said microprocessor, while the electronic receiving device of the set comprises a remote control receiver equipped with a receiving antenna, output of said receiver being connected with input of a microprocessor connected bidirectionally with a system for detecting position of referee on the sports field and with input of a relay supplying power to LEDs mounted in the luminous signalling system connected with lead supplying power to LEDs mounted in elastic LED strips connected electrically to each other and installed, together with said electronic receiving device, on surface of the sports field in locations marked in colours according to regulations applicable to the practised sports discipline, whereas both the microprocessor and the remote control receiver coupled electrically with the latter are connected to a power pack.

4. The set of devices according to claim 3, wherein the electronic whistle is an electronic whistle comprising a sensor reacting to pressure exerted by mouth of the referee, said sensor being situated in mouthpiece portion of the whistle, coupled with a reed relay, and further coupled with microprocessor of analogous electronic transmitting device.

* * * * *